United States Patent [19]

Sakai et al.

[11] 4,222,802

[45] Sep. 16, 1980

[54] PROCESS FOR PRODUCING ELECTRIC WINDINGS

[75] Inventors: Masahiko Sakai, Hitachi; Toshikazu Narahara, Naka; Toru Koyama, Hitachi; Shinichi Toyoda, Katsuta; Kazuo Goto, Mito, all of Japan

[73] Assignee: Hitachi, Ltd., Japan

[21] Appl. No.: 38,424

[22] Filed: May 14, 1979

[30] Foreign Application Priority Data

Jun. 2, 1978 [JP] Japan .................................. 53-65753

[51] Int. Cl.² ............................................. H01B 13/06
[52] U.S. Cl. .................................. 156/53; 174/110 E; 174/120 SR; 427/116; 427/435; 427/117; 528/75
[58] Field of Search ............... 427/116, 104, 435, 302, 427/117, 386; 156/53, 56, 329; 174/110 E, 120 SR, 121 SR; 528/75

[56] References Cited

U.S. PATENT DOCUMENTS

| 2,882,183 | 5/1956 | Bond et al. | 174/120 SR |
|---|---|---|---|
| 3,369,947 | 2/1968 | Mertens et al. | 156/56 |
| 3,585,065 | 6/1971 | Johnson | 528/75 |
| 4,096,291 | 6/1978 | Dunwald et al. | 427/116 |

Primary Examiner—Michael F. Esposito
Assistant Examiner—Richard Bueker
Attorney, Agent, or Firm—Craig & Antonelli

[57] ABSTRACT

Electric machine windings produced by wrapping a composite insulating material around an electrical conductor, said composite insulating material having been prepared by bonding two or more insulating materials with a silicone resin containing hydroxyl groups in the molecular structure, impregnating said composite insulating material with an insulating varnish comprising 1 equivalent of a polyfunctional epoxy compound and 2.5 to 25 equivalents of a polyfunctional isocyanate compound and curing said varnish, have excellent insulation properties under high temperatures and high humidity and thermal resistance of class H or more.

8 Claims, No Drawings

PROCESS FOR PRODUCING ELECTRIC WINDINGS

This invention relates to a process for producing electric machine windings, more particularly to a process for producing highly moisture resistant and heat resistant electric windings having excellent insulation properties even under high humidity and high temperatures.

Recently, in electric machines such as rotary machines, etc., highly moisture resistant and heat resistant electric windings having excellent insulation properties even under high humidity and high temperatures have been demanded with the enlargement of capacity or miniaturization and weight saving of electric machines, or with the use of electric machines under severe conditions. In order to meet such demands, there have been studied electric windings having thermal resistance of class H to class C by combining insulating materials obtained by bonding heat resistant materials such as glass tape, mica tape, polyimide tape, polyamide tape, etc. each other by using heat resistant resin adhesives such as polyimide resins, polyamide resins, silicone resins, diphenyl ether resins, epoxy resins, etc. with heat resistant resin insulating varnishes such as polyimide resins, silicone resins, epoxy resins, etc. But, there have not been developed electric windings having thermal resistance corresponding to class C. Among various combinations mentioned above, electric windings having the most excellent thermal resistance can be obtained in the case of using silicone resins. But in such a case, there is much room for improving mechanical strength and moisture resistance of silicone resins themselves.

It is an object of this invention to provide a process for producing highly moisture resistant and heat resistant electric windings having thermal resistance of class H to class C and excellent moisture resistance, overcoming disadvantages of conventional windings as mentioned above.

This invention provides a process for producing an electric winding which comprises
wrapping a composite insulating material around an electrical conductor, said composite insulating material having been obtained by bonding two or more insulating materials with a silicone resin containing hydroxyl groups in the molecular structure,
impregnating said composite insulating material with an insulating varnish comprising 1 equivalent of a polyfunctional epoxy compound and 2.5 to 25 equivalents of a polyfunctional isocyanate compound, and
curing the resulting impregnated composite insulating material.

In electric machine windings, when one or more very small voids are generated in the insulating layer or layers, degradation of the material around the voids is accelerated by corona discharge. At the same time, a decomposed gas is generated due to the degradation and is expanded to increase inner pressure, which results in peeling of insulating layers and lowering in insulation properties. The degree of lowering in such a case becomes greater when the winding is used under extremely high temperatures such as in the case of that having thermal resistance of class C. Therefore, it is necessary to use an insulating material having particularly excellent properties in impregnation with a varnish. In order to meet such a requirement, special composite insulating materials such as a combination of glass tape and mica sheet, a combination of a polymer sheet having imide rings in the molecular structure and mica sheet, etc. are used in this invention, also taking thermal resistance of the materials into consideration.

On the other hand, from the viewpoint of wrapping workability of the composite insulating material around an electrical conductor, the composite insulating material should be formed in one piece and should be excellent in flexibility. In order to meet such requirements, selection of adhesives for bonding at least two insulating materials for forming composite insulating materials is very important in this invention. Further, said adhesives should prevent the generation of very small voids which cause peeling of insulating layers of the winding. In order to satisfy these requirements, silicone resin containing hydroxyl groups in the molecular structure (hereinafter referred to as "silicone resin containing hydroxyl groups") is used in this invention.

Silicone resins containing hydroxyl groups are different from addition polymerization type silicone resins in that the former can adhere two or more insulating materials very strongly and thus is effective for preventing the resulting laminated insulating materials from peeling due to insufficient adhesive strength. Further, the silicone resins containing hydroxyl groups have good thermal resistance due to having siloxane linkages in the main molecular chain, so that the generation of decomposed gas due to degradation is very little, which results in scarcely causing peeling of laminated insulating material layers due to accumulation of the decomposed gas in the laminated insulating material layers. In addition, since the silicone resins containing hydroxyl groups have remarkably larger gas permeability coefficient due to their molecular structure comparing with other organic materials, even if there is generated a gas due to degradation, it can easily be released out of the insulating layer system and there hardly takes place peeling of laminated insulating materials due to the accumulation of the decomposed gas in the laminated insulating material layers. Still further, the most important thing in using the silicone resins containing hydroxyl groups is that the hydroxyl groups in the silicone resins can easily be reacted with the isocyanate moieties of epoxy-isocyanate series resins used as an insulating varnish for impregnation to form a strong and tough insulating layer by combining the insulating materials and the insulating varnish uniformly in one piece. According to the results of thermal resistance tests, no sufficient result can be obtained for electric windings produced by using, as adhesive for bonding two or more insulating materials, heat resistant adhesives such as addition polymerization type silicone resins containing no hydroxyl group, polyimide resins, polyamide resins, diphenyl ether resins, etc.

As the insulating materials for forming the composite insulating materials, there can be used glass insulating materials commercially available such as glass tape, and the like, mica sheet commercially available, polymer sheet containing imide rings in the molecular structure such as polyimide film, polyamideimide film, etc. Among them, a combination of glass tape and mica sheet, e.g. glass tape-backed mica sheet, etc., and a combination of polymer sheet containing imide rings in the molecular structure and mica sheet, e.g. polyimide film or polyamideimide film-backed mica sheet, etc. are preferable.

As the mica sheet, that obtained in the form of sheet from soft or hard mica without calcination or with calcination can preferably be used.

As the polymer containing imide rings in the molecular structure, there can be used a reaction product of a tetracarboxylic acid anhydride and a diamine, a reaction product of a tetracarboxylic acid anhydride and a diisocyanate, a reaction product of bisphthalimide or bismaleimide and a diamine, a reaction product of bisphthalimide or bismaleimide and a vinyl compound, and the like. As the polyamideimide, there can be used a reaction product obtained by reacting a reaction product of an excess primary diamine and a dicarboxylic acid chloride, with a tetracarboxylic acid anhydride, a reaction product obtained by reacting a reaction product of a tetracarboxylic acid anhydride and an excess diamine, with a dicarboxylic acid chloride, a reaction product of a primary diamine and trimellitic acid anhydride, and the like. There can also be used polyesterimide compounds which can be obtained from a reaction product of trimetallitic acid anhydride with a diol as a precursor using the same procedure as mentioned in the case of obtaining the polyamideimide compounds. Among these polymers containing imide rings, from the viewpoints of availability, workability and physical and chemical properties, etc., Kapton (a polyimide film manufactured by E. I. du Pont de Nemours & Co.), Pifron II (a polyamideimide film manufactured by Hitachi Chemical Co., Ltd.) and the like can preferably be used.

As the silicone resin containing hydroxyl groups, there can be used that obtained by conventional processes, e.g. by formulating silanes represented by the formulae, $RSiX_3$, $R_2SiX_2$ and $R_3SiX$, wherein R is hydrogen, an alkyl group such as methyl, ethyl, etc., an aromatic group, such as phenyl, tolyl, etc.,; and X is halogen or a group which can be hydrolyzed such as alkoxy, in a desired composition depending on objects, hydrolyzing the resulting composition with addition of water, carrying out partial dehydration condensation of the hydroxyl groups bonded to silicon atoms in the presence of heat or a catalyst, and increasing degree of polymerization to a proper value.

These silicone resins containing hydroxyl groups are available commercially. For example, there can preferably be used silicone resins KR-275 (hydroxyl group content 0.5–1% by weight), KR-272 (hydroxyl group content 2% by weight), KR-214 (hydroxyl group content 4% by weight) and KR-216 (hydroxyl group content 6% by weight), all of them being manufactured by Shin-etsu Silicone Co., Ltd., together with amine compound catalysts such as triethanolamine, etc. or organometallic salt catalysts such as zinc octoate, etc. It is preferable to use silicone resins containing hydroxyl groups in an amount of 0.5% by weight or more and more preferably 6% by weight or less. The silicone resins can be used alone or as a mixture of two or more of them. Too high hydroxyl group contents make the silicone resins solid at room temperature, so that too high hydroxyl group content is not preferable from the viewpoint of workability.

The amount of silicone resin containing hydroxyl groups to be coated on insulating materials, e.g. mica sheet, is not limited particularly, but from the viewpoints of workability, impregnation properties with varnish, and properties of electric windings, it is preferable to use 1 to 35% by weight of the silicone resin based on the total weight of the silicone resin and the insulating materials, e.g. mica sheet and glass type.

The composite insulating material can be prepared by a conventional method. The composite insulating material is wrapped around an electrical conductor using a conventional method.

Subsequently, the wrapped composite insulating material is impregnated with the insulating varnish comprising a polyfunctional epoxy compound and a polyfunctional isocyanate compound with special proportions.

As the polyfunctional epoxy compound used in the present invention, there can be used bifunctional epoxides such as, for example, diglycydylether of bisphenol A, butadiene diepoxide, 3,4-epoxycyclohexylmethyl-(3,4-epoxy)-cyclohexane carboxylate, vinylcyclohexene dioxide, 4,4'-di(1,2-epoxyethyl)diphenylether, 4,4'-di(1,2-epoxyethyl)biphenyl, 2,2-bis(3,4-epoxycyclohexyl)propane, diglycidyl ether of resorcinol, diglycidyl ether of phloroglucinol, diglycidyl ether of methylphloroglucinol, bis(2,3-epoxycyclopentyl)ether, 2-(3,4-epoxy)cyclohexane-5,5-spiro(3,4-epoxy)-cyclohexane-m-dioxane, bis(3,4-epoxy-6-methylcyclohexyl)adipate, N,N'-m-phenylenebis(4,5-epoxy-1,2-cyclohexanedicarboxyimide) and the like; and tri- or more functional epoxy compounds such as triglycidyl ether of p-aminophenol, polyallylglycidyl ether, 1,3,5-tri(1,2-epoxyethyl)benzene, 2,2',4,4'-tetraglycidoxybenzophenone, tetraglycidoxytetraphenylethane, polyglycidyl ether of phenol-formaldehyde novolac, triglycidyl ether of glycerol, triglycidyl ether of trimethylolpropane and the like. With respect to the other epxoy compounds, a book entitled "Epoxy Resins" (American Chemical Society, 1970) written by Henry Lee and a book entitled "Handbook of Epoxy Resin" (McGraw Hill Book Co., 1967) written by Henry Lee and K. Neville contain the descriptions of the resins.

Among the aforesaid polyfunctional epoxides, the diglycydylether of bisphenol A and the polyglycydylether of phenol-formaldehyde novolac have a particular good reactivity. Therefore, they are useful compounds. Further, the halides of these compounds can be used, too.

As the polyfunctional isocyanate compounds, there can be used bifunctional isocyanates, such as, for example, methane diisocyanate, butane-1,1-diisocyanate, ethane-1,2-diisocyanate, butane-1,2-diisocyanate, trans-vinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, $\omega,\omega'$-1,3-dimethylbenzene diisocyanate, $\omega,\omega'$-1,4-dimethylbenzene diisocyanate, $\omega,\omega'$-1,3-dimethylcyclohexane diisocyanate, $\omega,\omega'$-1,4-dimethylcyclohexane diisocyanate, $\omega,\omega'$-1,4-dimethylbenzene diisocyanate, $\omega,\omega'$-1,4-dimethylnaphthalene diisocyanate, $\omega,\omega'$-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4-diisocyanate, naphthalene-1,4-diisocyanate, naphthalene-1,5-diisocyanate, biphenyl-4,4′-diisocyanate, 3,3′-dimethylbiphenyl-4,4′-diisocyanate, 2,3′-dimethoxybiphenyl-4,4′-diisocyanate, diphenylmethane-4,4′-diisocyanate, 3,3′-dimethoxydiphenylmethane-4,4′-diisocyanate, 4,4′-dimethoxydiphenylmethane-3,3′-diisocyanate, diphenylsulfide-4,4′-diisocyanate, diphenylsulfone-4,4′-diisocyanate and the like; and trifunctional or more isocyanates, such as, for example, polymethylenepolyphenylisocyanate, triphenylmethanetriisocyanate, tris(4-isocyanatephenyl)thiophosphate), 3,3′,4,4′-diphenylmethanetetraisocyanate and the like.

Further, dimers and trimers of the foregoing polyisocyanates are useful. The dimers and trimers are terminated by free isocyanate groups and contain one or more isocyaurate ring or uretdione ring, or both. Methods of preparing various kinds of trimers and uretdiones are disclosed in U.S. Pat. No. 3,494,888; U.S. Pat. No. 3,108,100; and U.S. Pat. No. 2,977,370, etc.

Liquid polyisocyanates are also useful to obtain varnishes of the compositions. Among the liquid polyisocyanates preferable are mixtures of a polyisocyanate and carbodiimide polyisocyanates disclosed in German Offenlegungsschrift No. 2,601,927; Belgian Pat. No. 678,773; German Offenlegungsschrift No. 1,904,575; W. Neuman, P. Fischer: Angewandte Chemide, vol. 74, p. 803 (1962); F. Kurzer, K. Douraghi-Zadahi: Chemical Review, vol. 67, pp. 110–120 (1967); U.S. Pat. No. 3,657,161; U.S. Pat. No. 3,157,662; U.S. Pat. No. 2,491,983; U.S. Pat. No. 3,426,025; U.S. Pat. No. 3,406,198; etc. The carbodiimide polyisocyanates are represented by the general formula:

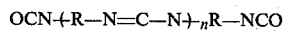

wherein R is a residue of a polyisocyanate and n is an integer of not less than one, preferably one to four.

The proportions of the epoxy compound and the isocyanate compound in the insulating varnish should be within limited ranges in order to impart excellent thermal resistance to the cured article. Said proportions are 2.5 to 25 equivalents of the isocyanate compound per equivalent of the epoxy compound. If the proportions are outside the above-mentioned range, the resulting cured article has no good balance in weight loss by heating, electrical properties, mechanical properties, etc., which may result in lowering in insulation properties of the electric winding.

In order to form isocyanurate rings and oxazolidone rings in the molecular structure by reacting the epoxy compound and the isocyanate compound in the insulating varnish with heating, it is necessary to use a hetero ring forming catalyst. As these catalysts, organic compounds having at least one atom selected from the elements belonging to the group Va in the periodic table in the molecule are useful.

Examples of suitable catalysts are tertiary amines such as trimethylamine, triethylamine, tetramethylbutanediamine, tetramethylpentanediamine, tetramethylhexanediamine, triethylenediamine, N,N-dimethylaniline, etc.; oxyalkylamines such as dimethylaminoethanol, dimethylaminopentanol, etc.; amines such as tris(dimethylaminomethyl)phenol, N-methylmorpholine, N-ethylmorpholine, etc.; quaternary ammonium salts such as cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allyldodecyltrimethylammonium bromide, benzyldimethylstearylammonium bromide, benzyldimethyltetradecylammonium acetate, etc.; imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 1-(4,6-diamino-s-triazinyl-2-ethyl)-2-ethylimidazole, 1-(4,6-diamino-s-triazinyl-2-ethyl)-2-phenylimidazole, 1-(4,6-diamino-s-triazinyl-2-ethyl)-2-isopropylimidazole, 2-phenylimidazole, 1-(4,6-diamino-s-triazinyl-2-ethyl)-2-ethylimidazole, 1-(4,6-diamino-s-triazinyl-2-ethyl)-2-methylimidazole, 1-(4,6-diamino-s-triazinyl-2-ethyl)-2-undecylimidazole, etc.; tetra-substituted borate type compounds of phosphorus, arsenic, antimony and bismuth such as

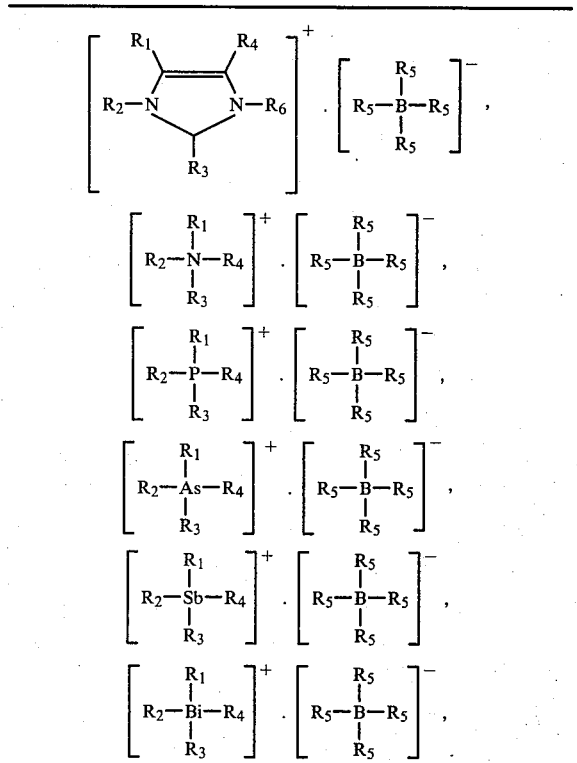

wherein $R_1$, $R_2$, $R_3$, $R_4$ and $R_6$ are independently hydrogen, an alkyl group having 1 to 5 carbon atoms, an alkenyl group having 2 to 6 carbon atoms, a phenyl group, or a substituted phenyl group such as a $C_{1-4}$ alkyl-substituted phenyl group, a $C_{1-4}$ alkoxy-substituted phenyl group, and $R_5$ is a phenyl group, or a substituted phenyl group such as a $C_{1-4}$-alkyl-substituted phenyl group, a $C_{1-4}$ alkoxy-substituted phenyl group.

Among them, those having nitrogen oxide or phosphorus are particularly useful from the viewpoints of availability and workability.

These catalyst are preferably used in an amount of 0.001 to 10.0% by weight based on the weight of the insulating varnish. If the amount of the catalyst is outside the above-mentioned range, the resulting cured article shows a tendency to become brittle or to generate a gas due to thermal degradation much more.

In some cases, the catalyst for the insulating varnish may be mixed with the silicone resins containing hydroxyl groups and added to the insulating materials prior to the impregnation with the insulating varnish. In such cases, it is very important for improving properties of the resulting electric winding to conduct a condensation reaction of the silicone resin with heating at a temperature not to decompose the catalyst thermally and at the same time not to lower flexibility of the composite insulating tape. This is because if the condensation reaction of the silicone resin is conducted in the insulating layers of the electric winding, there will be formed very small voids due to the generation of condensation water in the insulating layers, degradation of the materials around the voids will be accelerated by corona discharge in such portions, and gas generated by the degradation will expand and increase the inner pressure so as to cause peeling between the insulating layers and to lower insulation properties of the winding. Therefore, it is preferable to cure the silicone resin which bonds the insulating materials with heating at a temperature of 80° to 160° C.

This invention is illustrated in more detail by way of the following Examples in which all parts and percents are by weight unless otherwise specified.

EXAMPLES 1 TO 3

(1) Preparation of a composite insulating material

Glass-backed mica tape of 25 mm wide was prepared by piling uncalcined soft mica sheet on glass tape, coating a toluene or xylene solution of silicone resin containing hydroxyl groups (hydroxyl group content 2%; KR-272 manufactured by Shin-etsu Silicone Co., Ltd.) therebetween so that the amount of the silicone resin as a solid became 15% based on the total weight, and cutting superfluous portions. Zinc octoate as a curing catalyst was included in the silicone resin in an amount of 1% together with 2-ethyl-4-methylimidazole (2E4MZ) (manufactured by Shikoku Kasei Co., Ltd.) as a curing catalyst for an insulating varnish in an amount as listed in Table 1. The glass-backed mica tape was dried at 80°–160° C. for 15 hours with heating.

(2) Preparation of an insulating varnish

An insulating varnish of epoxy-isocyanate series for impregnation was prepared by mixing 100 parts of a bisphenol series diglycidyl ether (DER-332 manufactured by Dow Chemical Co., epoxy equivalent 175) and 200, 400 or 800 parts of liquid diphenylmethane diisocyanate (Desmodur CD manufactured by Bayer A. G., isocyanate equivalent 140).

(3) Production of electric winding

The composite insulating material prepared in the above-mentioned (1) was wrapped around a bare electric conductor. The resulting winding was vacuum impregnated under pressure with the insulating varnish prepared in the above-mentioned (2) and then cured at 100°–150° C. for 20 hours and at 200°–220° C. for 4 hours with heating.

Moisture resistance and thermal resistance of the resulting windings were tested in the following two ways.

(A) Moisture resistance and thermal resistance test

A sample was heated at 270° C. for 24 hours and subsequently was placed under the conditions of a temperature of 40° C. and a relative humidity of 95% for 24 hours. This procedure was defined as one cycle and repeated for 10 times. Each end of each cycle, dielectric loss tangent (tan δ) and insulation resistance were measured. The results are as shown in Table 1.

(B) Short time thermal resistance test

A specimen of 50×50 mm was cut out of the insulating layer of the electric winding mentioned above and heated at 270° C. for 10 days to measure a weight loss due to thermal degradation. The results are as shown in Table 1.

EXAMPLE 4

(1) Preparation of a composite insulating material

Glass-backed mica tape was prepared in the same manner as described in Example 1 except for using a silicone resin containing hydroxyl groups (hydroxyl group content 4%; KR-214 manufactured by Shin-etsu Silicone Co., Ltd.) and 4.0 parts of 1-cyanoethyl-2-phenylimidazole (2PZ-CN) (manufactured by Shikoku Kasei Co., Ltd.) as a curing catalyst for an insulating varnish.

(2) Preparation of an insulating varnish

An epoxy-isocyanate series insulating varnish was obtained by mixing 70 parts of DER-332, 30 parts of a novolac type polyglycidyl ether (DEN-431 manufactured by Dow Chemical Co., epoxy equivalent 175) and 1200 parts of Desmodur CD.

(3) Production of electric winding

Using the materials prepared in the above items (1) and (2), an electric winding was produced in the same manner as described in Example 1 (3).

The same tests as described in Example 1 were conducted. The results are listed in Table 1.

EXAMPLE 5

(1) Preparation of a composite insulating material

Glass-backed mica tape of 25 mm wide was prepared by piling uncalcined soft mica sheet on glass tape, coating a solution of silicone resin mixture prepared by mixing KR-216 (hydroxyl group content 6%, manufactured by Shin-etsu Silicone Co., Ltd.) and KR-272 (hydroxyl group content 2%) with a mixing ratio of 2:1 by weight therebetween so that the amount of the silicone resins as a solid became 15% based on the total weight, and cutting superfluous portions. 2PZ-CN as a curing catalyst for an insulating varnish was also included in the silicone resin mixture in an amount of 4.0 parts together with 1% of zinc octoate as a curing catalyst. The glass-backed mica tape was dried at 80°–160° C. for 15 hours with heating.

(2) Preparation of an insulating varnish

An epoxy-isocyanate series insulating varnish was obtained by mixing 70 parts of DER-332, 20 parts of DEN-431, 10 parts of novolac type polyglycidyl ether (DEN-438 manufactured by Dow Chemical Co., epoxy equivalent 178) and 2000 parts of Desmodur CD.

(3) Production of electric winding

Using the materials prepared in the above items (1) and (2), an electric winding was produced in the same manner as described in Example 1 (3).

The same tests as described in Example 1 were conducted. The results are listed in Table 1.

EXAMPLES 6 TO 9

(1) Preparation of a composite insulating material

Glass-backed mica tape of 25 mm wide was prepared by piling uncalcined soft mica sheet on glass tape, coating a solution of silicone resin containing hydroxyl groups (hydroxyl group content 0.5–1.0%; KR-275 manufactured by Shin-etsu Silicone Co., Ltd.) therebetween so that the amount of the silicone resin as a solid became 15% based on the total weight, and cutting superfluous portions. The glass-backed mica tape was dried at 80°–160° C. for 15 hours with heating except for Example 9. As a curing catalyst for the silicone resin, 1% of zinc octoate was used in Example 6 and 1% of triethanolamine was used in Examples 7 to 9, while 3.0 parts of 2E4MZ was used as a curing catalyst for an insulating varnish in Examples 6 to 9. But in Example 8, 2E4MZ was not added to the silicone resin but to the insulating varnish.

(2) Preparation of an insulating varnish

An epoxy-isocyanate series insulating varnish was obtained by mixing 100 parts of DER-332, and 800 parts of liquid diphenylmethane diisocyanate (Desmodur CD). But in Example 8, the curing catalyst 2E4MZ was added to the insulating varnish.

(3) Production of electric winding

Using the materials prepared in the above items (1) and (2), an electric winding was produced in the same manner as described in Example 1 (3).

The same tests as described in Example 1 were conducted. The results are listed in Table 1.

EXAMPLES 10 TO 12

(1) Preparation of a composite insulating material

Polyimide film-backed mica tape of 25 mm wide was prepared by piling calcined hard mica sheet on polyimide sheet (Kapton, a registered trademark of E. I. du Pont de Nemours & Co.), coating a solution of silicone resin containing hydroxyl groups (hydroxyl group content 2%; KR-272) therebetween so that the amount of silicone resin as a solid became 10% in Example 10, 20% in Example 11, and 30% in Example 12, based on the total weight, and cutting superfluous portions. The polyimide film-backed mica tape was dried at 80°–160° C. for 15 hours with heating. As a curing catalyst for the silicone resin, 1% of zinc octoate was used and as a curing catalyst for an insulating varnish, 2PZ-CN was used in an amount as listed in Table 1.

(2) Preparation of an insulating varnish

An epoxy-isocyanate series insulating varnish was obtained by mixing Desmodur CD and DER-332 and in Example 10 together with DEN-431 in amounts as listed in Table 1.

(3) Production of electric winding

Using the materials prepared in the above items (1) and (2), an electric winding was produced in the same manner as described in Example 1 (3).

The same tests as described in Example 1 were conducted. The results are listed in Table 1.

EXAMPLES 13 TO 15

(1) Preparation of a composite insulating material

Polyimide film-backed mica tape of 25 mm wide was prepared by piling calcined hard mica sheet on polyimide sheet (Kapton), coating a solution of silicone resin containing hydroxyl groups (hydroxyl group content 0.5–1.0%; KR-275) therebetween so that the amount of the silicone resin as a solid became 15% based on the total weight, and cutting superfluous portions. The polyimide film-backed mica tape was dried at 80°–160° C. for 15 hours except for Example 15. As a curing catalyst for the silicone resin, 1% of zinc octoate was used in Example 13 and 1% of triethanolamine was used in Examples 14 and 15, while as a curing catalyst for an insulating varnish, 4.5 parts of (4,6-diamino-s-triazinyl-2-ethyl)-2-undecylimidazole ($C_{11}Z$-AZINE) (manufactured by Shikoku Kasei Co., Ltd.) was added to the silicone resin.

(2) Preparation of an insulating varnish

An epoxy-isocyanate series insulating varnish was prepared in the same manner as described in Example 6 (2).

(3) Production of electric winding

Using the materials prepared in the above items (1) and (2), an electric winding was produced in the same manner as described in Example 1 (3).

The same tests as described in Example 1 were conducted. The results are listed in Table 1.

EXAMPLE 16

(1) Preparation of a composite insulating material

Polyamideimide film-backed mica tape of 25 mm wide was prepared by piling calcined hard mica sheet on polyamideimide sheet (Pifron II manufactured by Hitachi Chemical Co., Ltd.), coating a solution of silicone resin containing hydroxyl groups (hydroxyl group content 0.5–1.0%; KR-275) therebetween so that the amount of the silicone resin as a solid became 15% based on the total weight, and cutting superfluous portions. The polyamideimide film-backed mica tape was dried at 80°–160° C. for 15 hours. As a curing catalyst for the silicone resin, 1% of triethanolamine was added and as a curing catalyst for an insulating varnish, 4.5 parts of $C_{11}Z$-AZINE was added to the silicone resin.

(2) Preparation of an insulating varnish

An epoxy-isocyanate series insulating varnish was prepared in the same manner as described in Example 6 (2).

(3) Production of electric winding

Using the materials prepared in the above items (1) and (2), an electric winding was produced in the same manner as described in Example 1 (3).

The same tests as described in Example 1 were conducted. The results are listed in Table 1.

COMPARATIVE EXAMPLE 1

(1) Preparation of a composite insulating material

Glass-backed mica tape of 25 mm wide was prepared in the same manner as described in Example 1 (1) except for using as a curing catalyst for an insulating varnish 2PZ-CN as used in Example 4 (1).

(2) Production of electric winding

The procedure described in Example 1 (3) was repeated except for using an insulating varnish containing 100 parts of DER-332 and 120 parts of Desmodur CD for producing an electric winding.

The same tests as described in Example 1 were conducted. The results are listed in Table 1.

COMPARATIVE EXAMPLE 2

(1) Preparation of a composite insulating material

Glass-backed mica tape of 25 mm wide was prepared in the same manner as described in Comparative Example 1 (1).

(2) Production of electric winding

The procedure described in Example 1 (3) was repeated except for using an insulating varnish containing 100 parts of DER-332 and 2400 parts of Desmodur CD for producing an electric winding.

The same tests as described in Example 1 were conducted. The results are listed in Table 1.

COMPARATIVE EXAMPLE 3

(1) Preparation of a composite insulating material

Polyimide film-backed mica tape of 25 mm wide was prepared in the same manner as described in Example 13 (1) except for using as a curing catalyst for an insulating varnish 2PZ-CN as used in Example 4 (1).

(2) Production of electric winding

The procedure described in Example 1 (3) was repeated except for using an insulating varnish as used in Comparative Example 1 (2) for producing an electric winding.

The same tests as described in Example 1 were conducted. The results are listed in Table 1.

COMPARATIVE EXAMPLE 4

Polyimide film of 25 mm wide (Kapton) was wrapped around a bare conductor. The resulting winding was vacuum impregnated under pressure with the same insulating varnish as used in Example 2 except for containing 4.5 parts of 2PZ-CN. Then the same procedure as described in Example 1 (3) was repeated in order to produce an electric winding.

The same tests as described in Example 1 were conducted. The results are listed in Table 1.

COMPARATIVE EXAMPLE 5

(1) Preparation of a composite insulating material

Glass-backed mica tape of 25 mm wide was prepared by piling uncalcined soft mica sheet on glass tape, coating a heat resistant epoxy resin (DEN-438 manufactured by Dow Chemical Co., epoxy equivalent 178) therebetween so that the amount of the epoxy resin became 15% based on the total weight, and cutting superfluous portions.

(2) Preparation of an insulating varnish

An insulating varnish was prepared by mixing 400 parts of Desmodur CD, 100 parts of DER-332 and 4.5 parts of 2PZ-CN as in the case of Comparative Example 4.

(3) Production of electric winding

Using the materials prepared in the above items (1) and (2), an electric winding was produced in the same manner as described in Example 1 (3).

The same tests as described in Example 1 were conducted. The results are listed in Table 1.

COMPARATIVE EXAMPLE 6

The glass-backed mica tape used in Example 7 was wrapped around a bare conductor and impregnated under reduced pressure with a solventfree addition polymerization type silicone resin (KR-2019, Shin-etsu Silicone Co., Ltd.) containing 1.5 parts of dicumyl peroxide per 100 parts of the resin as a polymerization catalyst. The impregnated insulating varnish was cured at 160° C. for 15 hours and at 200° C. for 15 hours to produce an electric winding.

The same tests as described in Example 1 were conducted. The results are listed in Table 1.

As is clear from the results shown in Table 1, the electric windings produced by wrapping the composite insulating materials prepared by bonding, for example, mica sheet to glass sheet or polyimide or polyamideimide or the like polymer sheet by using silicone resins containing hydroxyl groups in the molecular structure and impregnating the wrapped composite insulating materials with epoxy-isocyanate series insulating varnishes having special compositions are remarkably superior to those produced in Comparative Examples 5 and 6 in moisture resistance and thermal resistance. The properties of windings can be improved further by using composite insulating materials dried with heating prior to wrapping around conductors. In Comparative Example 4, since mica sheet is not used as insulating material, the insulating varnish is insufficiently impregnated into the insulating layers. In Comparative Example 5, although the epoxy resin adhesive having thermal resistance of class H is used, the generation of gas cannot be prevented and the gas thus generated cannot be released out of the insulating layers and causes peeling of the insulating layers due to highly increased inner pressure of the generated gas in the layers. Further the results of Comparative Examples 1 and 2 show that if the proportions of the polyfunctional epoxy compound and the polyfunctional isocyanate compound are outside the special range, moisture resistance and thermal resistance of the windings are lowered due to decreases of properties of the cured articles.

As mentioned above, according to this invention, insulated electric machine windings having excellent insulation properties under high temperatures and high humidity comparing with those obtained by a conventional method can be produced.

Table 1

| Example No. | | | 1 | 2 | 3 | 4 | 5 | 6 | 7 |
|---|---|---|---|---|---|---|---|---|---|
| Adhesive | Silicone resin | | KR-272 | KR-272 | KR-272 | KR-214 | KR-272 KR-216 | KR-275 | KR-275 |
| | Catalyst (wt. %) | Zn octoate | 1.0 | 1.0 | 1.0 | 1.0 | 1.0 | 1.0 | — |
| | | Triethanol-amine | — | — | — | — | — | — | 1.0 |
| Adhesive content (wt. %) | | | 15 | 15 | 15 | 15 | 15 | 15 | 15 |
| Insulating material | | | G-U | G-U | G-U | G-U | G-U | G-U | G-U |
| Drying with heating | | | Done | Done | Done | Done | Done | Done | Done |
| Insulating varnish (parts) | Desmodur CD | | 200 | 400 | 800 | 1200 | 2000 | 800 | 800 |
| | DER-332 | | 100 | 100 | 100 | 70 | 70 | 100 | 100 |
| | DEN-431 | | — | — | — | 30 | 20 | — | — |
| | DEN-438 | | — | — | — | — | 10 | — | — |
| | NCO eq. ratio | | 2.5/1 | 5/1 | 10/1 | 15/1 | 25/1 | 5/1 | 5/1 |
| | Catalyst | 2E4MZ | 3.0 | 3.0 | 10 | — | — | 3.0 | 3.0 |
| | | 2PZ-CN | — | — | — | 4.0 | 4.0 | — | — |
| | | $C_{11}$Z-AZINE | — | — | — | — | — | — | — |
| Properties | | | | | | | | | |
| Moisture and thermal | Initial time | tan δ (%) | 1.8 | 1.6 | 1.2 | 1.4 | 1.9 | 1.2 | 1.2 |
| | | Meg. (MΩ) | ∞ | ∞ | ∞ | ∞ | ∞ | ∞ | ∞ |
| | After 5 cycles | tan δ (%) | 11.4 | 8.3 | 8.2 | 9.3 | 10.9 | 10.0 | 9.3 |
| | | Meg. (MΩ) | ∞ | ∞ | ∞ | ∞ | ∞ | ∞ | ∞ |

Table 1-continued

| | | | | | | | | |
|---|---|---|---|---|---|---|---|---|
| resist- | After 10 | tan δ (%) | 8.8 | 8.3 | 6.1 | 8.3 | 8.5 | 8.5 | 7.3 |
| ance | cycles | Meg. (MΩ) | ∞ | ∞ | ∞ | ∞ | ∞ | ∞ | ∞ |
| Weight loss (%), 270° C./10 days | | | 8.1 | 7.2 | 6.8 | 6.5 | 6.3 | 6.9 | 7.1 |

(Note)
G-U: Glass-backed mica tape,
K-U: Polyimide film-backed mica tape,
P-U: Polyamideimide film-backed mica tape

| Example No. | 8 | 9 | 10 | 11 | 12 | 13 | 14 | 15 | 16 |
|---|---|---|---|---|---|---|---|---|---|
| Silicone resin | KR-275 | KR-275 | KR-272 | KR-272 | KR-272 | KR-275 | KR-275 | KR-275 | KR-275 |
| Zn octoate | — | — | 1.0 | 1.0 | 1.0 | 1.0 | — | — | — |
| Triethanolamine | 1.0 | 1.0 | — | — | — | — | 1.0 | 1.0 | 1.0 |
| Adhesive content | 15 | 15 | 10 | 20 | 30 | 15 | 15 | 15 | 15 |
| Insulating material | G-U | G-U | K-U | K-U | K-U | K-U | K-U | K-U | P-U |
| Drying | Done | None | Done | Done | Done | Done | Done | None | Done |
| Desmodur CD | 800 | 800 | 400 | 800 | 2000 | 400 | 400 | 400 | 400 |
| DER-332 | 100 | 100 | 50 | 100 | 100 | 100 | 100 | 100 | 100 |
| DEN-431 | — | — | 50 | — | — | — | — | — | — |
| DEN-438 | — | — | — | — | — | — | — | — | — |
| NCO eq. ratio | 5/1 | 5/1 | 5/1 | 10/1 | 25/1 | 5/1 | 5/1 | 5/1 | 5/1 |
| 2E4MZ | 3.0* | 3.0 | — | — | — | — | — | — | — |
| 2PZ-CN | — | — | 3.0 | 4.5 | 10 | — | — | — | — |
| C₁₁Z-AZINE | — | — | — | — | — | 4.5 | 4.5 | 4.5 | 4.5 |
| Properties | | | | | | | | | |
| Initial time tan δ (%) | 1.3 | 1.9 | 1.1 | 1.2 | 1.4 | 1.1 | 1.2 | 1.4 | 1.2 |
| Meg (MΩ) | ∞ | ∞ | ∞ | ∞ | ∞ | ∞ | ∞ | ∞ | ∞ |
| After 5 cycles tan δ (%) | 8.2 | 11.3 | 11.0 | 11.3 | 12.0 | 10.5 | 10.1 | 12.1 | 11.1 |
| Meg (MΩ) | ∞ | 800 | ∞ | ∞ | ∞ | ∞ | ∞ | ∞ | ∞ |
| After 10 cycles tan δ (%) | 6.3 | 12.5 | 10.7 | 12.3 | 13.2 | 9.6 | 9.8 | 14.0 | 10.0 |
| Meg (MΩ) | ∞ | ∞ | ∞ | ∞ | ∞ | ∞ | ∞ | ∞ | ∞ |
| Weight loss (%) | 7.2 | 9.8 | 6.0 | 6.6 | 7.0 | 6.2 | 6.1 | 8.3 | 7.6 |

(Note)
*The catalyst was added to the insulating varnish.

| | | Comparative Example No. | 1 | 2 | 3 | 4 | 5 | 6 |
|---|---|---|---|---|---|---|---|---|
| | Silicone resin | | KR-272 | KR-272 | KR-272 | (Epoxy resin) | (Epoxy resin) | KR-275 |
| Adhesive Catalyst (wt. %) | Zn octoate | | 1.0 | 1.0 | 1.0 | — | — | — |
| | Triethanol-amine | | — | — | — | — | — | 1.0 |
| Adhesive content (wt. %) | | | 15 | 15 | 15 | — | 15 | 15 |
| Insulating material | | | G-U | G-U | K-U | K | G-U | G-U |
| Drying with heating | | | Done | Done | Done | None | None | Done |
| Insulating varnish (parts) | Desmodur CD | | 120 | 2400 | 120 | 400 | 400 | |
| | DER-332 | | 100 | 100 | 100 | 100 | 100 | {Addition polymn. type silicone resin} |
| | NCO eq. ratio | | 1.5/1 | 30/1 | 1.5/1 | 5/1 | 5/1 | |
| | Catalyst 2PZ-CN | | 1.5 | 10 | 1.5 | 4.5* | 4.5* | |
| Properties | | | | | | | | |
| Moisture and thermal resist-ance | Initial time | tan δ (%) | 2.2 | 2.1 | 1.9 | 3.2 | 1.2 | 2.1 |
| | | Meg. (MΩ) | ∞ | ∞ | ∞ | ∞ | ∞ | ∞ |
| | After 5 cycles | tan δ (%) | 18.6 | 17.5 | 19.1 | 18.0 | 21.0 | 18.5 |
| | | Meg. (MΩ) | 500 | 500 | 500 | 500 | 100 | 100 |
| | After 10 cycles | tan δ (%) | 17.5 | 19.3 | 18.9 | 20.0 | 21.9 | 19.7 |
| | | Meg. (MΩ) | 80 | 80 | 80 | 80 | 5 | 5 |
| Weight loss (%), 270° C./10 days | | | 10.1 | 9.4 | 11.6 | 18.6 | 20.6 | 6.8 |

(Note)
K: Polymide tape
*: The catalyst was added to the insulating varnish.

What is claimed is:

1. A process for producing an electric winding which comprises
   wrapping a composite insulating material around an electrical conductor, said composite insulating material having been obtained by bonding two or more insulating materials with a silicone resin containing hydroxyl groups in the molecular structure, impregnating said wrapped composite insulating material with an insulating varnish comprising 1 equivalent of polyfunctional epoxy compound and 2.5 to 25 equivalents of a polyfunctional isocyanate compound, and
   curing the resulting impregnated composite insulating material.

2. A process according to claim 1, wherein the silicone resin contains hydroxyl groups in an amount of 0.5% by weight or more and 6.0% by weight or less.

3. A process according to claim 1 or 2, wherein the composite insulating material is prepared by bonding two or more insulating materials selected from the group consisting of glass insulating materials, mica sheet, and polymer sheet containing imide rings in the molecular structure with a silicone resin containing hydroxyl groups in the molecular structure.

4. A process according to claim 1 or 2, wherein the composite insulating material is glass-backed mica tape.

5. A process according to claim 1 or 2, wherein the composite insulating material is polyimide film-backed or polyamideimide film-backed mica tape.

6. A process according to claim 1, wherein the composite insulating material is prepared by bonding two or more insulating materials with a silicone resin containing hydroxyl groups in the molecular structure and including a curing catalyst for the silicone resin together with a curing catalyst for the insulating varnish and the resulting composite insulating material is dried with heating prior to the impregnation with the insulating varnish.

7. A process according to claim 1, wherein the insulating varnish further comprises a curing catalyst for the insulating varnish.

8. A process according to claim 6 or 7, wherein the catalyst for the insulating varnish is an organic compound having at least one atom selected from the group consisting of nitrogen, phosphorus, arsenic, antimony and bismuth.

\* \* \* \* \*